United States Patent

Kerruish

[11] 4,184,119
[45] Jan. 15, 1980

[54] RADIO EQUIPPED SPACE TOY

[75] Inventor: Kermit D. Kerruish, Phoenix, Ariz.

[73] Assignee: Wayne Crieghton Morley, El Toro, Calif.

[21] Appl. No.: 895,772

[22] Filed: Apr. 12, 1978

[51] Int. Cl.² .......................................... H04B 1/08
[52] U.S. Cl. ..................................... 325/361; 46/227
[58] Field of Search ............... 46/227, 74 D, 228, 229, 46/230, 232, 175 R, 175 AM; 325/352, 361; 312/7 R; D14/68–75, 77, 79, 80

[56] References Cited

U.S. PATENT DOCUMENTS

| D. 162,829 | 4/1951 | Hoeflich | D14/69 |
| D. 173,767 | 12/1954 | Schrader | 325/352 |
| D. 191,638 | 10/1961 | Harper | D14/69 |
| 1,927,453 | 9/1933 | Hill | 325/352 |
| 2,470,384 | 5/1949 | Waldron | 325/352 |
| 3,071,895 | 1/1963 | Gelfand et al. | 46/227 |
| 3,233,362 | 2/1966 | Chapman | 46/227 |
| 3,394,491 | 7/1968 | Valentine | 46/227 |
| 3,720,018 | 3/1973 | Peterson et al. | 46/228 |

FOREIGN PATENT DOCUMENTS 2027688 12/1971 Fed. Rep. of Germany .......... 46/74 D

OTHER PUBLICATIONS

Transistor pet, The New York Times, Sep. 10, 1963, p. 205.

*Primary Examiner*—Louis G. Mancene
*Assistant Examiner*—Paul J. Hirsch
*Attorney, Agent, or Firm*—Don J. Flickinger

[57] ABSTRACT

A space toy including an outer casing which resembles a flying saucer and houses a radio receiver and a blinking light system. Three legs project beneath the bottom of the casing, with one leg being connected to the radio to provide an on/off switch and for volume adjustment. Another leg is connected to the radio for tuning purposes. The casing includes a turret which houses a plurality of lights which are connected into a system for causing them to blink on and off in a haphazard manner. The turret includes a dome and upstanding therefrom is a switch lever which resembles an antenna and which turns the lighting system on and off.

7 Claims, 4 Drawing Figures

U.S. Patent      Jan. 15, 1980      4,184,119
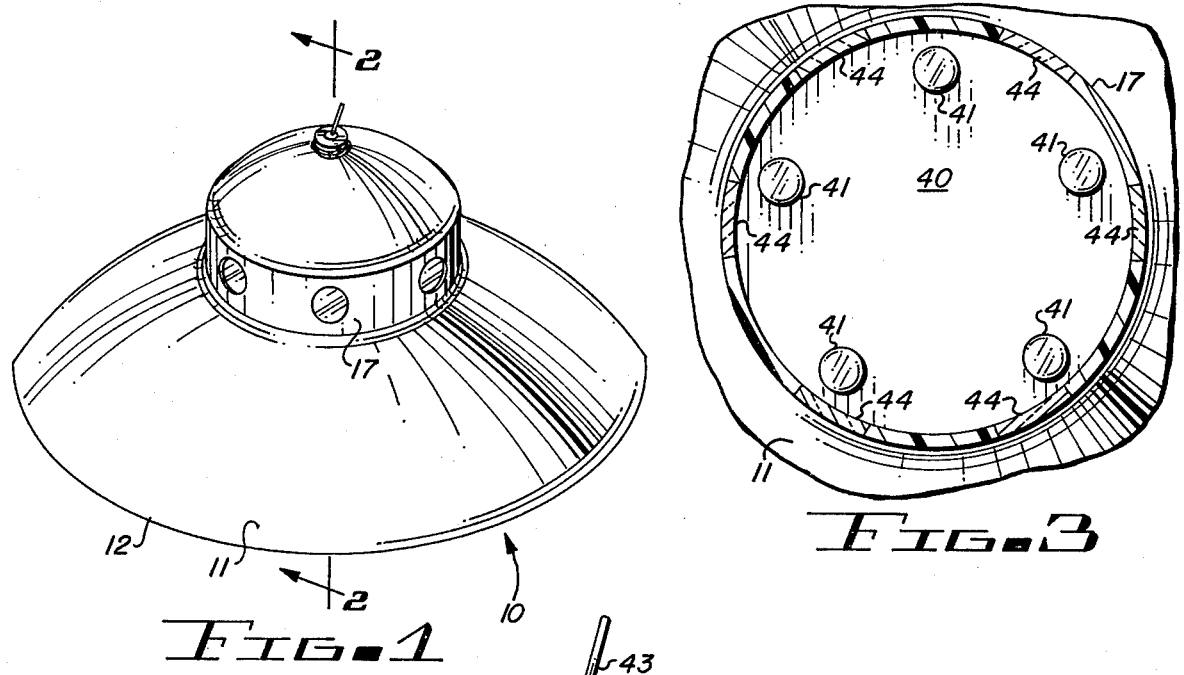
FIG. 1
FIG. 3
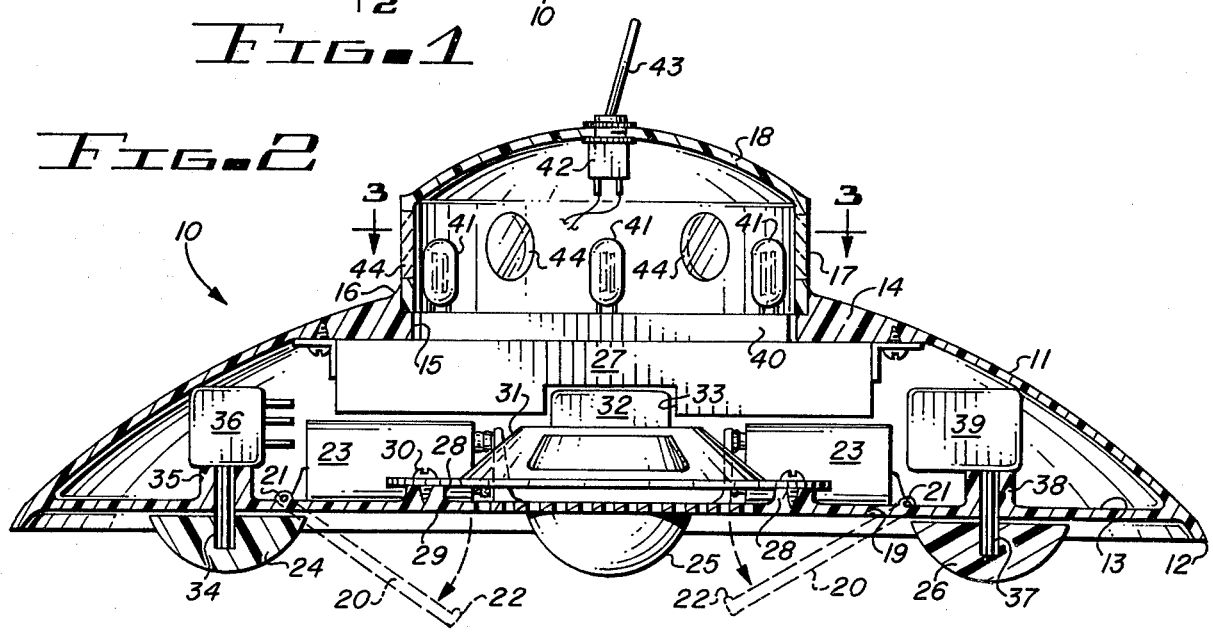
FIG. 2
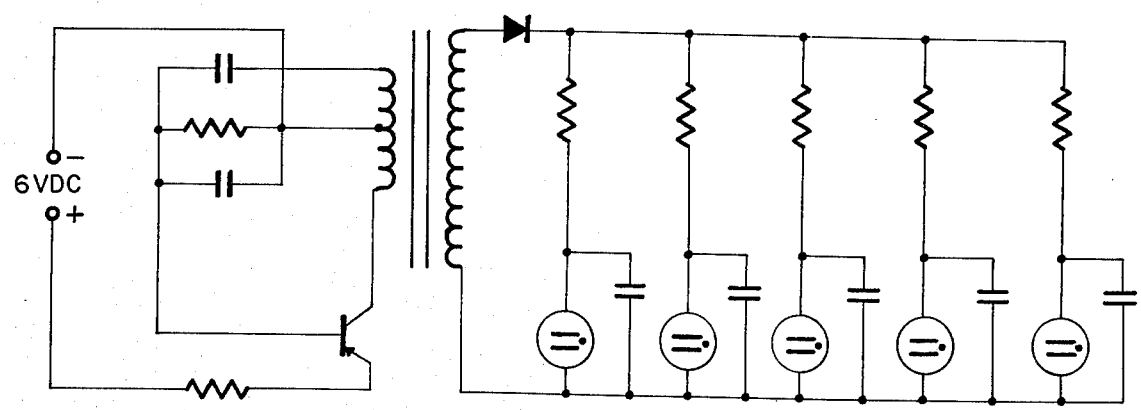
FIG. 4

RADIO EQUIPPED SPACE TOY

The present invention relates to a radio equipped space toy and is concerned primarily with such a toy which resembles a flying saucer and has control elements which resemble structural features of a flying saucer.

BACKGROUND OF THE INVENTION

At the present time the public is particularly aware of unidentified flying objects, commonly known as UFO's, and particularly those of the flying saucer type. It has been known to provide a space station toy which is not in simulation of a flying saucer, but resembles a space ship and includes a sound-producing device which is electrically operated by batteries, and with the pitch of the sound being changed by an adjustable knob. It is also known to provide a disc-shaped flight toy which is similar to a flying saucer and which includes illuminating means.

A space toy that resembles a robot in appearance and which includes audible signal means is also known. And, finally, it is noted that a transister radio is housed in a casing that closely resembles the head of a clown or like caricature and which includes adjustable knobs on opposite sides in simulation of ears.

Before this application was prepared for filing in the Patent and Trademark Office, a patentability search was conducted on the subject matter hereof and this search brings to light the following patents as those believed to come closest to the instant toy flying saucer:

| Campbell | 3,798,833 | Kawano | D-240,270 |
| Valentine | 3,394,491 | Yu-Cheung | D-237,308 |
| Peterson et al. | 3,720,018 | Viani | D-159,699 |
| Dressler | 4,054,286 | Johnson | D-083,858 |
| Arai | D-188,703 | McQuarrie | D-234,158 |
| Andre | D-187,111 | Gelfand | 3,071,895 |

A brief comment is made on the more pertinent of these patents as follows:

Yu-Cheung

This design patent discloses what is apparently a casing for housing a radio which is in the shape of the head of a clown or other fictional character. Protruding from opposite sides of the head are a pair of operating knobs which apparently constitute the controls for the transister radio which is included in the housing.

Gelfand

This patent is to a space toy which, as illustrated in FIGS. 1 and 2, offers the appearance of a robot. It includes a leg assembly 36 but no functions are attributed to these legs other than that of supporting the body of the toy. It also includes a dome 40 having a simulated radio attenna 50.

Peterson et al.

This patent discloses a flight toy in the shape of a flying saucer and includes a dome 18 which houses a lightbulb 24.

Valentine

It is believed that this patent discloses a space weapon toy which is the closest approach to the subject flying saucer. Note FIGS. 2 and 3 which have a pronounced resemblance to a flying saucer. Sound is produced and emanated through speaker 30. Button 44 and dial 46 control the sound which is battery energized, as indicated by the battery 10.

No comment is made on the remainder of the above-listed patents other than to point out that they are believed to complete the picture of the prior art most relevant to the subject space ship.

OBJECTS OF THE INVENTION

With the foregoing conditions in mind, the present invention has in view the following objectives:

1. To provide a space toy that simulates a flying saucer and which includes a radio receiver and a system of blinking lights;

2. To provide a flying saucer toy of the type noted which includes a generally dome-shaped housing having a bottom wall, a cylindrical turret upstanding from the central portion of said housing, and a dome on said turret;

3. To provide a toy flying saucer of the character aforesaid in which three members project below the dome-shaped housing to provide supporting effects therefor, with two of said members constituting operating knobs for tuning and adjusting the volume of the radio mounted therein;

4. To provide a toy flying saucer of the kind described in which the turret houses a plurality of electric lamps which are connected to an electrical system for causing them to blink on and off in a haphazard manner, with the system being controlled by a switch having an operating lever projecting through the dome of the turret in simulation of an antenna;

5. To provide, in a toy flying saucer of the type noted, a housing including a turret having a cylindrical wall formed with a plurality of angularly spaced windows which are covered by a transparent material;

6. To provide, in a toy flying saucer of the character aforesaid, one or more batteries which operate the radio receiver and the light system; and 7. To provide, in a toy flying saucer of the kind described, a dome-shaped housing having a bottom wall formed with openings affording access to the batteries and which openings are normally closed by swinging panels.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are achieved by providing a space toy that simulates a flying saucer and includes a casing having a lower dome-shaped housing, together with a substantially flat bottom wall joined to the lower peripheral edges of said housing.

A turret comprising a cylindrical wall and a top dome is mounted centrally of the dome-shaped housing with the cylindrical wall being formed with a plurality of angularly spaced windows.

The bottom wall is formed with two access openings through which a pair of batteries may be passed and which openings are normally closed by a pair of swinging panels. Immediately above these batteries there is a radio receiver and above the latter are a plurality of angularly spaced electric lights which are blinked on and off by being connected into an electrical system which is powered by the batteries.

These lights assume positions within the turret and the system is under the control of an on/off switch immediately under the turret dome and which is operated by a lever projecting above the dome in simulation of an antenna.

Depending from the bottom floor of the dome-shaped housing are three legs which are generally semi-spheroidal in shape. One of these legs is drivably mounted on a shaft which extends through an opening in the bottom wall and is connected to an on/off switch and volume control for the radio. Another one of these legs is also drivably mounted on a shaft which extends through an opening in the bottom wall and is connected to a tuner which operates the condensers that are included as a part of the electric system. The electric system for the lights which are blinked in a haphazard or random manner is illustrated and described in the catalog entitled "Science Fair" which is copyrighted in 1969 by Radio Shack Division of Tandy Corporation.

It is evident that the rounded shape of the legs permit the toy to be moved over a smooth supporting surface with comparative ease. When it is desired that the radio be turned on, the leg which controls the on/off switch and volume is rotated. The other adjustable leg may be adjusted to tune the radio to a particular station. When it is desired that the blinking lights be operated at random, the lever for the on/off switch of that portion of the electric system for the lights is turned on by availing of the operating member projecting above the turret dome.

For a full and more complete understanding of the invention, reference may be had to the following description and accompanying drawing, wherein:

FIG. 1 is a perspective of a toy space ship embodying the precepts of this invention;

FIG. 2 is a transverse vertical section through the toy flying saucer, being taken on the plane of the line 2—2 of FIG. 1;

FIG. 3 is a horizontal section through the cylindrical wall of the turret, looking downwardly thereon, and taken on the line 3—3 of FIG. 2; and FIG. 4 is a schematic view illustrating the wiring diagram for the radio and the electric system for the random lighting arrangement.

DESCRIPTION OF A PREFERRED EMBODIMENT

Referring now to the drawing, wherein like reference characters denote corresponding parts, and first more particularly to FIGS. 1, 2 and 3, the subject toy space ship is shown as including a casing identified in its entirety by the reference character 10. While casing 10 could conceivably be made of different materials, plastic is indicated as the preferred material because of the ease with which it may be molded into the required shape.

Casing 10 includes a dome-shaped housing 11 having a lower peripheral edge 12 and a bottom wall 13 which is integrally joined to housing 11 closely adjacent to the peripheral edge 12 of the latter. Housing 11 includes a thickened portion 14 which defines a central circular opening 15 which is countersunk at 16 with the countersink receiving the lower edge of a cylindrical wall 17 formed as a part of a turret, which also includes a dome top 18 that is integrally joined to the upper edge of cylindrical wall 17.

Bottom wall 13 is formed with a pair of openings 19 each of which is normally closed by a panel 20 which is hingedly mounted at 21 to the bottom wall. Panel 20 is formed with the end remote from pivot 21 with a rounded projection 22 which is received in an opening (not illustrated) in wall 13 with a snap fit. With panel 21 assuming the broken line positions depicted in FIG. 2, a pair of batteries 23 may be passed through the openings 19 whereupon the panels 20 are swung into closed position to hold the batteries 23 in assembled relation within housing 11.

Depending below bottom wall 13 are three legs 24, 25 and 26, each of which is of plastic and has a semi-spheroidal shape, illustrated in FIG. 2. Supported above leg 25 is a radio receiver 27, with the support being provided by a ring 28, the peripheral portion of which is secured to bosses 29 upstanding from floor 13 and secured thereto by screws 30. Extending upwardly from ring 28 to which it is integrally joined is a frusto-conical member 31 which is connected at its upper end to a circular extension 32 which is received in a recess 33 formed in receiver 27.

Embedded in leg 24 axially thereof is the lower end of a shaft 34 which establishes a driving relation with leg 24. Shaft 34 passes through a boss 35 integrally with and upstanding from bottom wall 13 and to the upper end of which is connected the elements of an on/off switch and volume control which are represented diagrammatically in FIG. 2 by block 36.

Likewise, leg 26 has the lower end of a shaft 37 drivably embedded therein with shaft 37 passing through a boss 38 integral with and upstanding from bottom wall 13. A tuner for radio 27 is represented diagrammatically by a block 39.

Mounted within opening 15 of thickened portion 14 of housing 11 are the electronic components of a random lighting system which are represented by block 40. A plurality of electric lamps 41 are supported on and connected to this electronic system so as to be turned on and off in a random or haphazard manner by the system of block 40.

An on/of switch 42 for the lamps 41 is depicted as being suspended from the central portion of dome top 18. The switch 42 is operated by a lever 43 which extends through an opening in the dome top 18 and simulates an antenna.

It is believed unnecessary to here describe the manner in which the batteries 23 are connected to the radio receiver 27 for the electronic system represented by block 40 because such electrical systems are now well known, available to the public and are susceptible to modification and change. It is believed to be sufficient for the purposes of this specification to point out that the wiring diagram of FIG. 4 is illustrated and described in the instruction sheet or catalog of "Science Fair" which is copyrighted in 1969 by Radio Shack Division of Tandy Corporation and particularly on what is the last page of the instruction sheet as it would normally be folded and under the heading, SCHEMATIC DIAGRAM—RANDOM.

OPERATION OF THE PREFERRED EMBODIMENT

While the manner of using and mode of operation of the subject toy space ship are believed to be obvious from the illustration of the drawing and description of parts set forth above, they may be briefly described as follows: With panels 20 closed, the toy space ship may be slid over and about any desired surface with a high degree of facility because of the shape of legs 24, 25 and 26 and the material of which they are made. With batteries 23 freshly charged, in the position of FIG. 2, panels 20 are closed. When it is desired to have the radio receiver 27 effective, leg 24 is rotated to turn on the on/off switch included at block 36 and adjust the volume of sound coming from radio receiver 27.

Likewise, to tune the radio 27, leg 26 is rotated to adjust the condensers included in the tuner represented by block 39.

At times, such as at night when it is desired that the turret be illuminated, lever 43 is thrown to move switch 42 into the position in which the electronic system for lamps 41 is effective. In accordance with this electronic system, lamps 41 are blinked in a haphazard or random manner with the light appearing in windows 44 in cylindrical wall 17.

While a preferred specific embodiment of the invention is hereinbefore set forth, it is to be clearly understood that the invention is not to be limited to the exact constructions, materials and devices illustrated and described because various modifications of these details may be provided in putting the invention into practice.

What is claimed is:

1. In a toy flying saucer:
   (a) a casing comprising
      (i) a dome-shaped housing having a flat bottom wall, and
      (ii) a turret upstanding from said housing centrally thereof and including a cylindrical wall and a domed top;
   (b) a plurality of angularly spaced windows in said cylindrical wall;
   (c) a plurality of electric lamps within said cylindrical wall and controlled by an electronic system causing said lamps to blink on and off at random;
   (d) a radio receiver within said dome-shaped housing;
   (e) a battery for delivering electricity to said radio receiver and the electronic system for said lamps; and
   (f) three legs equi-angularly spaced apart and extending below said bottom wall, one of said legs being rotatable and operatively connected to an on/off switch and a volume control for said radio receiver, another of said legs extending through said bottom wall and operatively connected to a tuner for said radio receiver, and an on/off switch depending from the domed top of the turret for controlling the electric system for said lamps and having an operating lever extending above said domed top in simulation of an antenna.

2. The toy flying saucer of claim 1 in which each of said legs is of plastic and is semi-spheroidal in shape.

3. The toy flying saucer of claim 2 in which a third leg supports said radio receiver within said dome-shaped housing.

4. The toy flying saucer of claim 1 in which said bottom wall is formed with an access opening through which said battery is passed and a hingedly mounted panel normally closing said opening.

5. The toy flying saucer of claim 4 in which there is a second battery, a second access opening in the bottom wall, and a second panel normally closing said second opening.

6. The toy flying saucer of claim 1 in which said dome-shaped housing is of plastic and has an annular thickened portion centrally thereof and defining an opening formed with a countersink which receives the lower end of the cylindrical wall of the turret.

7. The toy flying saucer of claim 5 in which said panels are pivotally mounted to said bottom wall together with cooperating elements of snap fasteners on the ends of said panels remote from their pivotal mountings and the bottom wall.

* * * * *